United States Patent Office 3,823,045
Patented July 9, 1974

3,823,045
PIPE COATING METHOD
Ralph Hielema, Calgary, Alberta, Canada, assignor to Hielema-Emmons Pipe Coating Ltd., Calgary, Alberta, Canada
Continuation-in-part of abandoned application Ser. No. 130,293, Apr. 1, 1971. This application July 31, 1972, Ser. No. 276,832
Int. Cl. B29c *27/28;* B31c *9/00;* B65h *81/00*
U.S. Cl. 156—188                          11 Claims

ABSTRACT OF THE DISCLOSURE

A method of enveloping an elongated joint of pipe with a protective coating. The pipe is maintained at approximately the temperature of the ambient air prior to extrusion of an adhesive layer to the pipe surface. Since the pipe is not preheated prior to application of the adhesive the quantity of heat to be removed during the cooling process is substantially reduced. The pipe is simultaneously rotated about its axis and advanced longitudinally to effectively wrap a sheet of extruded adhesive around the pipe in a spiral manner. The protective outer layer of the coating, which is a thermoplastic resin, is extruded onto the adhesive immediately after the latter has been applied to assure bonding between the hot extrudates of adhesive and resin. The sheet of thermoplastic resin extrudate is carefully controlled to assure it does not become elongated. This minimizes any cooling which would cause stresses in the final coating. The rate of advancement of the pipe surface away from the extruded resinous sheet is also controlled to not exceed 5% greater than the linear rate of advancement of the extrudate. This further prevents stresses from being built into the coating. The longitudinal rate of advancement of the pipe is controlled to assure that it will always be a fractional multiple of the width of the sheets of adhesive and resin, thus resulting in the placement of multiple plies of both resin and adhesive.

---

This application is a continuation-in-part of my copending application Ser. No. 130,293 entitled "A Process for Forming a Multi-Layer Resinous Coating on Circular Bodies," filed Apr. 1, 1971, now abandoned.

This invention relates to a method of forming a protective coating on an object having an elongated circular surface and, more particularly, to a method of enveloping a cylindrical joint of pipe or the like with a coating comprising a thermoplastic resin and a resin compatible adhesive.

It has long been known to place a protective coating around a pipe prior to placement of the pipe in the ground. Such protective coatings have taken various forms including those having the characteristic of an outer protective layer and an inner layer which will flow through any puncture in the outer layer should this occur. Several known coatings of this general type have utilized bituminous or asphaltic base inner layers which are applied to the pipe and then enveloped by a polymer sheet material such as polyethylene, polypropylene, polyvinyl chloride or the like. Coatings of this formulation have been found to exhibit only average to poor adhesion between the inner and outer layers which adversely affects coating strength and application of the coatings is becoming more and more difficult because of the pollution problems associated with hot bituminous or asphaltic base materials. Still another problem which has been encountered with known coatings of this type is the need to preheat the pipe to a relatively high temperature prior to application of the initial coating layer. This is an expensive procedure in and of itself, and the expense is further multiplied by the requirement that this heat be removed to cool the coating in order to enable the coated object to support its own weight.

Difficulties have also been experienced in the application processes for two layer coatings comprising an inner adhesive layer and an outer polymeric protective layer of the type described above. In one known prior art method a joint of pipe is passed through a circular die which extrudes the polymeric material onto the previously applied asphaltic underlayer. Utilization of the circumferentially extending die creates considerable problems of alignment and any misalignment will result in irregularities in the pipe coating which will extend the entire length of the pipe.

Another known method of applying a two layer coating is to first spray an asphaltic or bituminous base material onto the pipe and then extrude the outer synthetic resinous layer onto the previously coated pipe by drawing a sheet of the material over the pipe from an extruder with the pipe turning at a considerably faster rate than the rate of linear advancement of the extrudate. This will cause the sheet of resinous material to be pulled by the pipe and will have a thinning effect on it. It has heretofore been thought that this was desirable to insure a tight fit of the outer coating layer and prevent unevenness in the coating. It has been found, however, that the advantages of this method are largely offset by the fact that substantial stresses are built into the coating by stretching it tightly over the pipe and further stresses are caused by the cooling of the resinous sheet which takes place while it is being thinned into an elongated sheet.

Still another variation in the methods of the prior art is shown in the Landgraf et al. Pat. No. 3,616,006. While the method disclosed in the referenced patent has the disadvantages of preheating the pipe and stretching the outer protective resinous layer into an elongated sheet, an effort was made to improve the adhesion of the coating layers by placing the outer layer over the adhesive with the leading edges of the two layers disposed in substantially the same vertical plane. While improved adhesion does result using the patented method, the requirement of applying the two layers with their leading edges disposed in the same vertical plane eliminates the possibility of building up multiple plies of the adhesive layer. Thus, if complete coverage of the pipe with the adhesive is to be assured, each winding of the adhesive around the pipe must overlap the preceding winding to some degree and since the entire thickness of the adhesive is contained in a single pass, substantial unevenness in the final coating may result.

It is therefore an object of the present invention to provide a method of coating objects having elongated circular surfaces with a two layer coating comprising an outer protective layer and an inner layer which will cold flow under pressure to fill in damage to the outer layer yet which will have extremely high adhesion to the coated object.

Another object of this invention is to provide a coating as described in the foregoing object comprising a non-bituminous or non-asphaltic undercoat to avoid the pheric pollution problem associated with the application of such materials.

As a corollary to the above object, it is one of the aims of this invention to provide a method of coating pipe with a two layer coating comprising an adhesive and an outer protective layer wherein it is not necessary to heat the pipe prior to the application of the coating to obtain good adhesion.

Still another one of the objectives of this invention is to provide a method of coating objects having elongated circular surfaces with a coating as referred to in the foregoing objects, wherein the coating is extruded onto the object in sheets which are not allowed to elongate thus preventing stresses from building up in the coating.

A further aim of this invention is to provide a method of coating an object having an elongated circular surface wherein the rate of advancement of the surface relative to an extruded sheet of coating material is carefully controlled to avoid stretching the coating in a manner which would build stresses into the applied coating.

This invention also has as one of its objects a method of coating an object having an elognated circular surface as described in the foregoing objects wherein each layer of the coating may comprise multiple plies to assure adequate coverage of the coating and prevent unevenness in the final product.

Figure 1:
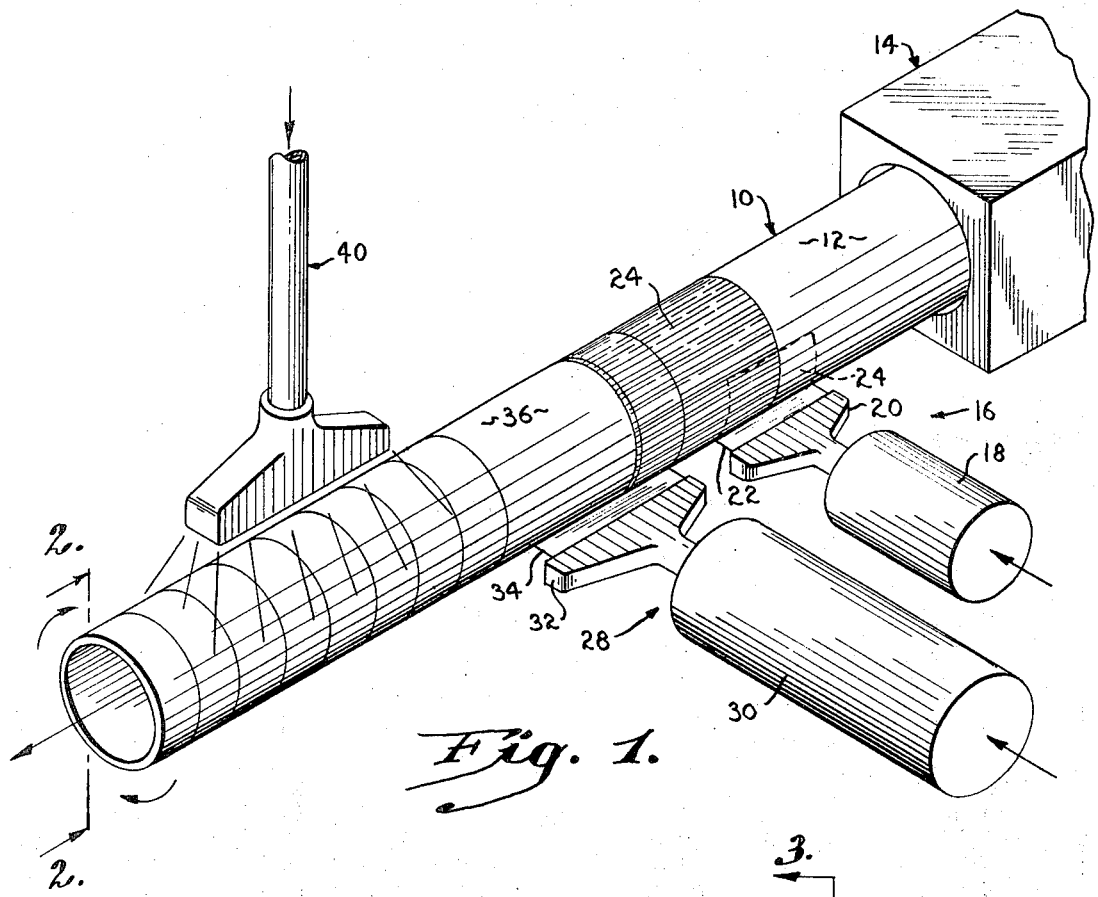
FIG. 1 is a partially schematic perspective view of apparatus for carrying out the method of the present invention to apply a coating to an elongated cylindrical joint of pipe.

Referring initially to FIG. 1, an elongated joint of pipe 10 having an outer cylindrical surface 12 is shown having a protective coating applied to the surface in accordance with the method of the present invention. The pipe 10 is first passed through a cleaning and drying station designated generally by the numeral 14 and illustrated schematically in FIG. 1. Equipment and procedures for cleaning the pipe to remove rust and scale are well known to those skilled in the art and need not be described in detail. Suffice it to say that it is preferable to clean the surface 12 by shot blasting to insure removal of foreign material and leave the surface in the best possible condition for application of the adhesive layer. While some drying of the surface may be necessary to remove moisture, and slightly elevated temperatures may be employed for this purpose, the temperature of the pipe should generally be maintained at substantially the level of the ambient air prior to aplication of the coating.

As the joint of pipe 10 emerges from cleaning and drying station 14, it is advanced longitudinally while simultaneously being rotated about its longitudinal axis as indicated by the arrows at the left-hand end of the pipe as shown in FIG. 1. Conveyor apparatus for achieving simultaneous rotation and longitudinal advancement is well known in the art and will not be described herein in the interests of brevity.

As the pipe 10 moves forward from station 14, it passes a first coating station designated generally by the numeral 16 where an adhesive layer is applied. Coating station 16 comprises a conventional screw-fed extruder 18 having a flat sheet-type die 20. Die 20 is laterally movable in a horizontal plane to accommodate joints of pipe or other objects having elongated circular surfaces of different diameters. To this end, it has been found highly desirable to dispose die 20 in a horizontal plane forming a tangent to pipe 10 at the lowest point on the latter.

A rubber base adhesive is extruded onto surface 12 in a thin sheet 22 which emerges from die 20. The rate of longitudinal advancement of pipe 10 should be controlled to a fractional multiple of no greater than one-half the width of sheet 22. This will assure that each circumferential wrapping 24 of the adhesive extruded from die 20 will overlap the preceding wrapping by at least 50 percent as indicated by the broken line illustration in FIG. 1. Accordingly, a two-ply adhesive layer as designated generally by the numeral 26 in FIG. 3 will be deposited on the surface of pipe 10. Each ply will be specially wound around the surface as a result of the simultaneous rotating and longitudinal advancement of the pipe. Die 20 may be positioned sufficiently close to surface 12, and the rate of advancement of the surface relative to the rate of advancement of sheet 22, controlled to prevent elongation of the sheet and maintain its length to a fractional multiple of its width.

Figures 2, 3:
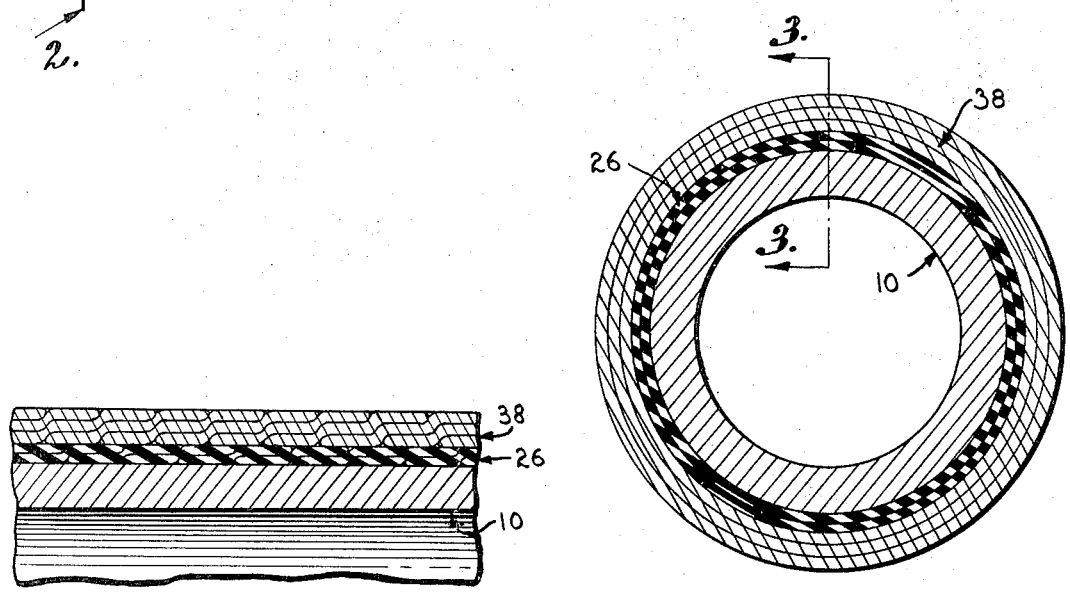
FIG. 2 is an enlarged vertical cross-sectional view taken through the joint of pipe along line 2—2 of FIG. 1.
FIG. 3 is a vertical cross-sectional view taken along line 3—3 of FIG. 2.

The second coating layer which comprises a thermoplastic resinous material is applied at a second coating station designated generally by the numeral 28. Coating station 28 comprises a conventional screw-fed extruder 30 having a flat sheet type die 32. Die 32 is movable laterally in a horizontal plane to accommodate pipe or other objects having elongated circular surfaces of different diameters. Again, as discussed with reference to die 20, it is highly desirable to position die 32 in a horizontal plane forming a tangent to the surface of the object being coated at the lowest point on the surface. A sheet 34 of the thermoplastic coating material emerges from die 32 and is carried around surface 12 in a spiral fashion due to the simultaneous rotation and longitudinal advancement of pipe 10. Each circumferential pass of sheet 34 presents a wrapping 36 around the pipe. Again, the width of die 32 and the rate of longitudinal advancement of the pipe are correlated so that the latter is a fractional multiple of no greater than one-half of the width of sheet 34. In the preferred embodiment as illustrated in the drawing, the rate of longitudinal advancement of pipe 10 is one-third the width of sheet 34 to cause each wrapping 36 of the thermoplastic layer to overlap the previous wrapping by two-thirds and thus build up a 3-ply layer 38 as best illustrated in FIG. 3. Application of the resinous layer 38 should follow application of adhesive layer 26 in sufficiently close proximity in time to assure bonding of the thermoplastic resin to the adhesive. On the other hand, there should be a sufficient time lapse between application of the adhesive layer 26 and the thermoplastic resin 38 to allow the adhesive layer to be built up in multiple plies. As will be apreciated by those well skilled in the art, a rubber base adhesive such as is utilized in the present in the present invention will generally need to be extruded within a temperature range of 250 to 400° F. It has been found that when the thermoplastic resin layer 38 is extruded not more than five seconds subsequent to application of the rubber adhesive layer sufficient heat from the latter exists to insure complete bonding between the two layers. To prevent stresses from building up in the coating, it is desirable to position die 32 sufficiently close to the object being coated and to control the rate of advancement of surface 12 so that sheet 34 will not become elongated and the length thereof will always remain a fractional multiple of its width. This asures that cooling of the extrudate will be held to an absolute minimum and will prevent stresses from building up in the thermoplastic resin material.

It has also been found that a vastly superior coating results when the rate of linear advancement of surface 12 past die 32 is carefully controlled relative to the rate of linear advancement of sheet 34 from the die. The rate of linear advancement of surface 12 relative to sheet 34 should be slightly greater than the rate of linear advancement of the sheet to insure a certain tautness in the sheet and prevent unevenness in the coating. The rate of advancement of the surface should not be more than five percent faster than the linear rate of advancement of the resin sheet, however, to avoid tension on the sheet which would cause stresses to be built into the coating. For optimum results, the length of sheet 34 should be maintained at a fractional multiple of the width of the sheet and the rate of linear advancement of the sheet should be controlled to within five percent of the rate of linear advancement of surface 12.

After application of the second layer 38, the entire coated surface is passed beneath a cooling station designated generally by the numeral 40. Cooling station 40 may incorporate a suitable water spray or air cooling means sufficient to lower the tempreature of the coated pipe to a level which will permit the pipe to support its own weight without damage to the coating. In general, the temperature should be lowered to approximately 150 degrees F. or below the coated pipe is handled. The fact that the temperature of pipe 10 is maintained at substantially the temperature of the ambient air prior to application of either of the coating layers, allows the pipe to function as a heat sink for removal of heat from the hot extrudate thus greatly reducing the requirements for cooling at station 40.

Numerous natural and synthetic rubber base formulations have been found to be useable for the adhesive layer in the method of the present invention. In general, the formulations should include, in addition to rubber, a suitable plasticizer, a tacifying resin, an anti-oxidant to counter the strong oxidizing condition present on the surface of a pipe, and other additives to facilitate extrusion through conventional equipment. The following three examples illustrate suitable formulations for the adhesive layer:

EXAMPLE I

| Component: | Parts by weight |
|---|---|
| Isobutylene-isoprene rubber | 70 |
| Styrene-butadiene rubber | 15 |
| Natural rubber | 15 |
| Polyterpene resin (plasticizer) | 90 |
| Phenyl-beta-naphthylamine | 1 |
| N,N'-disalicyclidene-1,2-propanediamine | 1 |
| Polybutene | 30 |
| Magnesium silicate | 25 |

EXAMPLE II

| Component: | Parts by weight |
|---|---|
| Isobutylene-isoprene rubber | 30 |
| Ethylene-propylene rubber | 30 |
| Isobutylene-isoprene reclaimed rubber | 60 |
| Polymerzied olefins and diofins resin | 90 |
| Magnesium silicate | 30 |
| Polybutene | 25 |
| Phenyl-beta-naphthylamine | 1 |
| N,N'-disalicylidene-1,2-propanediamine | 1 |

EXAMPLE III

| Component: | Parts by weight |
|---|---|
| Isobutylene-isoprene rubber | 100 |
| Polymerized-oelfins and diofins resin | 50 |
| Phenyl-beta-naphthylamine | 1 |
| N,N'-diphenyethylene diamine | 1 |
| Polybutene | 20 |
| Magnesium silicate | 20 |

The adhesive layer is preferably applied in at least two plies each having a thickness of approximately five mils. By reducing the thickness of each ply while increasing the number of plies, the smoothness of the final coating is enhanced. A conventional screw fed extruder equipped with a sheet type die is the preferred applicator of the adhesive layer. Specifications for extruders of this type are normally given in terms of the $L/D$ ratio which represents the working length of the screw relative to the screw diameter. An $L/D$ ratio of from 8/1 to 16/1 is preferred for application of the adhesive layer. The thickness of the extrudate emerging from the die is adjusted by controlling the speed of the feed screw. For the formulations given in Examples I–III, the extrusion temperature will normally be within the range of 350 to 400 degrees F.

Various thermoplastic resins may be utilized for the second layer of the coating. Examples of suitable thermoplastic materials which may be utilized include low and high density polyethylene, polyvinyl chloride, and acrylonitrile-butadiene-styrene copolymer. Again, a conventional screw fed extruder having a sheet type die is the preferred apparatus for applying the protective thermoplastic resinous layer. It has been found that optimum results are obtained utilizing an extruder of the specified type having an $L/D$ ratio of 18/1 to 30/1. The thermoplastic resinous layer may be applied in thicknesses of from 20 to 40 mils although a thickness within the range of 5 to 15 mils is preferred. The second layer should preferably comprise at least three plies, each having a thickness of one-third of the total thickness of the layer.

It is a very desirable characteristic of a coating applied according to the method of the present invention that in the event the outer protective layer is punctured the underlying adhesive layer will cold flow under the pressure of the outer layer to completely fill in the puncture in the outer layer. It has, however, been found that because of the greatly superior adhesion between the inner and outer layers which results from their application according to the teachings of the present invention, that the outer layer is much less subject to damage and puncture than has heretofore been the case.

While the method of the present invention has been particularly described with reference to the coating of a cylindrical joint of pipe, it will be appreciated that the method has application to the coating of any object which presents an elongated circular outer surface.

Having thus described the invention, what is claimed as new and desired to be secured by Letters Patent is:

1. A method of forming a protective coating comprising a thermoplastic resin and a resin compatible adhesive on an object having an elongated circular metal surface, the object being initially maintained at a temperature substantially equal to that of the ambient air prior to contact of the coating with the pipe, said method comprising the steps of:
   rotating the object about its longitudinal axis;
   simultaneously advancing the object longitudinally;
   extruding a sheet of said adhesive onto said surface;
   extruding a sheet of said resin onto the adhesive sheet in sufficiently close proximity in time to the first extruding step to assure bonding of the resin to the adhesive;
   controlling the longitudinal advancement to a rate which is a fractional multiple of no greater than one-half the width of the smallest of said sheets;
   controlling the linear advancement of said surface relative to the linear rate of advancement of said resin sheet to a rate at least equal to and not greater than 5% faster than the rate of linear advancement of the resin sheet; and
   controlling the length of said sheet of resin to a fractional multiple of the width of said sheet whereby to prevent elongation of said sheet and minimize stress build up in the coating.

2. A method as set forth in claim 1, wherein is included the step of cleaning the object to remove foreign material prior to said extruding steps.

3. A method as set forth in claim 2, wherein is included the step of drying said object to remove any moisture immediately subsequent to said cleaning step and prior to said extruding step.

4. A method as set forth in claim 1, wherein is included the step of controlling the length of the sheet of adhesive to a fractional multiple of the width of said sheet.

5. A method as set forth in claim 1, wherein is included the step of controlling the linear rate of advancement of said surface relative to said sheet of adhesive to at least equal to and not more than 5% faster than the linear rate of advancement of said adhesive sheet.

6. A method as set forth in claim 5, wherein is included the step of cooling said coating to a temperature which will permit the coated pipe to support its own weight.

7. A method as set forth in claim 1, wherein the step of controlling the longitudinal advancement comprises maintaining said rate of longitudinal advancement at a rate no greater than one-half the width of said resin sheet.

8. A method as set forth in claim 1, wherein the step of extruding a sheet of resin comprises placing said sheet of resin onto said surface-applied adhesive sheet within not more than five seconds subsequent to the first-mentioned extruding step.

9. A method as set forth in claim 1, wherein the step of extruding a sheet of adhesive comprises extruding a product including rubber, a plasticizer for the rubber and a tackifying resin.

10. A method of enveloping an elongated cylindrical joint of metal pipe with a protective coating comprising a thermoplastic resin and a resin-compatible adhesive, said method comprising the steps of:
- maintaining the temperature of the object at substantially the level of the ambient air prior to contact of the coating with the pipe;
- rotating the pipe at a constant speed about its longitudinal axis;
- simultaneously advancing the pipe longitudinally during rotation thereof;
- extruding a sheet of said adhesive onto the surface of the pipe;
- extruding a sheet of said thermoplastic resin onto the surface-applied adhesive within not more than five seconds subsequent to the first-mentioned extruding step;
- controlling the length of the sheet of resin to a fractional multiple of the width of said sheet;
- controlling the linear rate of advancement of the surface of the pipe relative to said sheet of resin to at least equal to and not more than 5% faster than the linear rate of advancement of said resin sheet; and
- controlling the longitudinal advancement of the pipe to a rate which is a fractional multiple of the width of the smallest of said sheets whereby to apply multiple layers of said adhesive and said resin.

11. A method as set forth in claim 10, wherein each of said extruding steps comprises extruding said sheets of adhesive and resin in a horizontal plane forming a tangent to said cylindrical pipe at the lowest point on the pipe.

References Cited

UNITED STATES PATENTS

| | | | |
|---|---|---|---|
| 3,687,765 | 8/1972 | MacLean et al. | 156—187 |
| 3,616,006 | 10/1971 | Landgraf et al. | 156—188 |
| 3,120,460 | 2/1964 | Schell et al. | 156—392 |
| 3,389,009 | 6/1968 | McNulty et al. | 156—392 |
| 3,616,178 | 10/1971 | Gurin | 161—190 |
| 3,385,179 | 5/1968 | Roe, Jr. | 156—244 |
| 2,112,865 | 4/1938 | Putnam | 156—392 |

CHARLES E. VAN HORN, Primary Examiner

B. J. LEWRIS, Assistant Examiner

U.S. Cl. X.R.

156—190, 195, 244, 309; 138—144, 150